July 17, 1951        T. L. FAWICK        2,561,104
REVERSE GEAR
Filed June 17, 1947
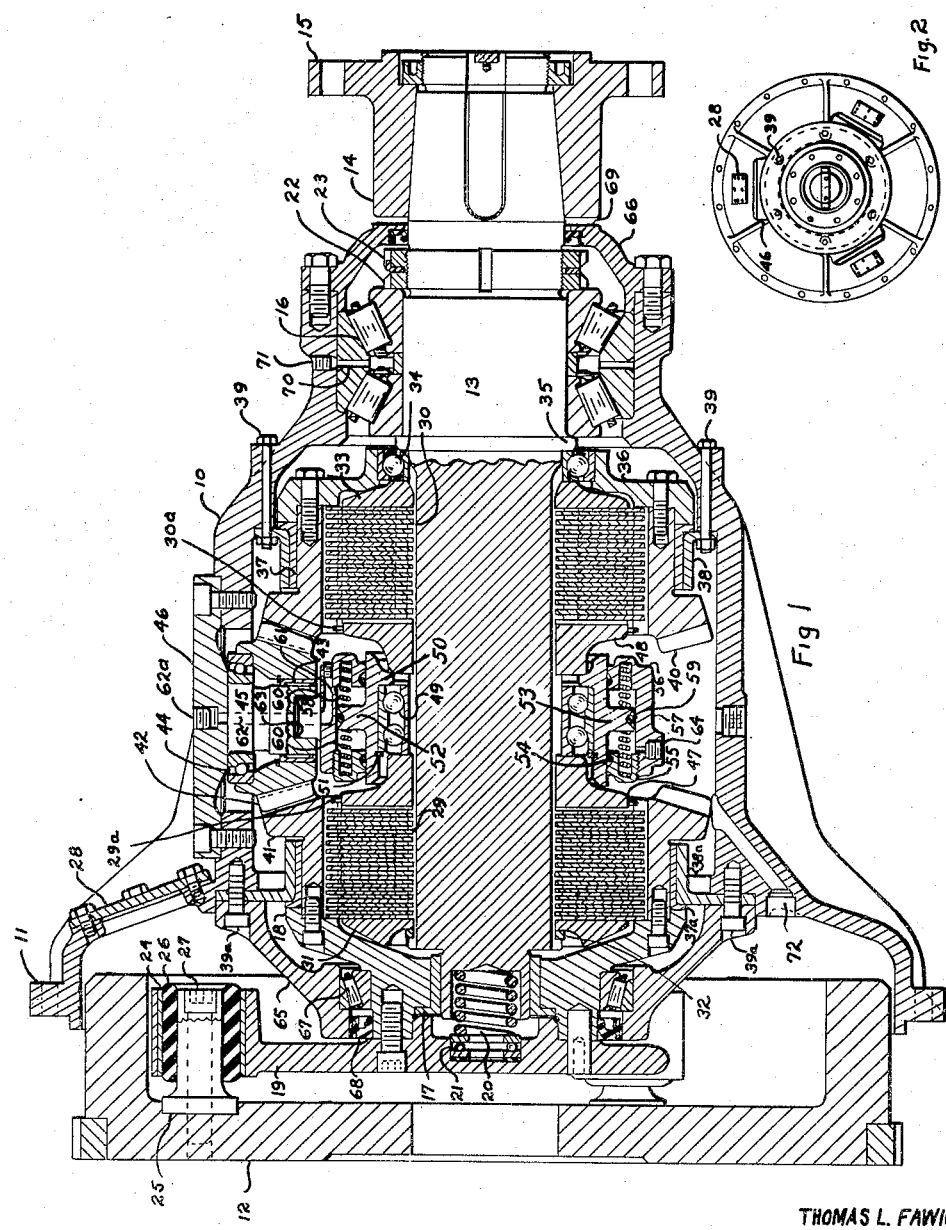
THOMAS L. FAWICK
INVENTOR
BY Willard D. Eakin
ATTORNEY Patented July 17, 1951

2,561,104

UNITED STATES PATENT OFFICE 2,561,104

REVERSE GEAR

Thomas L. Fawick, Cleveland, Ohio

Application June 17, 1947, Serial No. 755,156

3 Claims. (Cl. 74—379)

This invention relates to reverse gear and especially a reverse gear for marine service.

Its chief objects are to provide compact and neatly housed gearing; to provide facility of assembling and disassembling; to provide desirable cushioning of torque and of propeller thrust; to provide ready accessibility of parts without extensive disassembly of parts; to provide an assembly having all lubricated parts within a single oil-tight housing; to provide for the use of a housing having all of its major parts of full-circle annular form; to provide accuracy of alignments and also a desirable flexible-coupling effect; to provide for fluid actuation without rotation of fluid-impelled parts but with such parts housed within the gear case; to provide economy of construction; and to provide durability.

Of the accompanying drawings:

Fig. 1 is a vertical, longitudinal, middle section, with parts in elevation, of a reverse gear embodying my invention in its preferred form.

Fig. 2 is an end elevation of the same, from the right of Fig. 1, but on a smaller scale.

Referring to the drawings, 10 is a stationary housing having a bolting flange 11 for mounting it, 12 is the fly-wheel of the motor, and 13 is the driven shaft, having splined on its tapered rear end a shaft-head 14 formed with a bolting flange 15 for securing a marine propeller-shaft to it.

Near its rear end the driven shaft 13 is journaled in the housing 10 by means of a radial-and-thrust roller bearing 16 and at its forward end it is formed with a terminal portion of small diameter which is slidably journaled, by means of a bronze bushing 17, in a gear-mounting ring 18 which is bolted to a coupling member 19 which rotates with the fly-wheel 12.

The reduced front end portion of the driven shaft 13 is recessed in its end face to provide a seat for a compression spring 20 interposed between the shaft and a thrust bearing 21 which is seated in a recess formed at the center of the coupling member 19, the spring 20 being of such strength and having such pre-loading as to sustain, in forward drive, all of the propeller thrust at low speeds and a large part of it at higher speeds, the propeller thrust thus being cushioned and the bearing 16 relieved of a large part of the thrust.

A pair of lock-nuts 22, 23 are mounted upon the shaft 13 for transmitting to the bearing 16 such part of the thrust as it sustains.

The coupling member 19 is formed near its outer periphery with a circumferentially spaced set of axially extending through apertures or sockets in which are mounted, permissibly but not necessarily with a tight press fit, the respective outer metal shell members, such as the member 24, of thrust-cushioning and torque-cushioning rubber-bushing assemblies of which each comprises a broad-based hollow stud member 25 and a rubber bushing 26 which preferably is vulcanized to the stud and put under permanent radial compression by forcing it, with its stud, into the shell member 24, which axially elongates the rubber bushing so that its axial recoil thereafter maintains the radial compression.

The broad base of each stud 25 seats in a recess formed in the adjacent face of the fly-wheel 12 and is held therein by an Allen-head bolt 27 extending through the hollow stud 25 and screwed into the fly-wheel. The housing 10 is provided with a hand-hole and cover 28 at the position of each of the rubber-bushing assemblies, so that the latter, pre-assembled with the gearing and its housing, can be secured to the fly-wheel after the housing has been mounted by means of its bolting-flange 11, and released from the fly-wheel before the housing is dismounted.

Slidably splined upon the driven shaft 13 are the inner, alternate discs of a forward-drive clutch 29 and those of a reverse-drive clutch 30. The clutch 29 has an end plate or abutment member 31 splined upon the shaft and retained thereon by a snap-ring 32 seated in an annular groove in the shaft. The clutch 30 has an end plate or abutment member 33 splined on the shaft and seating against the inner race of a ball bearing 34, said race seating against an annular flange 35 formed on the shaft.

The ball bearing 34 is of the type which permits relative axial movement of its races and it is interposed between the driven shaft 13 and a gear-mounting ring 36 which has thrust-bearing engagement with a flanged bronze bushing 37 mounted in a flanged ring 38 which is secured within the housing by bolts 39, 39. Similarly the hub of the bevel gear 41 is journaled in a bronze bushing 37a held in a flanged ring 38a which secured in the housing by bolts 39a, 39a.

The outer, alternate discs of the clutch 30 are splined within the hub of a bevel gear 40 which surrounds the shaft 13 and is bolted to the gear-mounting ring 36, and outer, alternate discs of the clutch 29 are splined within the hub of a bevel gear 41 which surrounds the shaft 13 and is bolted to the gear-mounting ring 18.

Snap-rings 30a and 29a are provided for retaining the plates of the respective clutches in assembled relation.

Interposed between and meshed with the two bevel gears 40 and 41 are circumferentially spaced bevel gears such as the gear 42, each of which is mounted, with a radial roller-bearing 43 and a radial-and-thrust ball bearing 44, upon a central stud 45 formed integrally with and projecting inward from a strong base-plate closure member 46 which fits in the counter-sink of, and serves as a closure for, a hole formed in the housing 10.

For engaging the clutches 29 and 30 alternatively they are provided with respective push rings 47, 48, splined on the shaft 13 and adapted to be forced axially thereof by the inner race of a radial-and-thrust bearing 49 of which the outer race is secured by a flange 50 and a snap ring 51 within an annular member 52 which is formed on its outer face with an annular piston flange 53.

The outer face of the annular member 52, at each side of the piston flange 53, is slidably sealed, by a sealing ring 54, to the cylinder-head elements 55, 56 of an annular-chamber cylinder member 57 which is externally formed with circumferentially spaced studs, such as the stud 58, which fit respectively in recesses formed in the inner end faces of the gear-axle studs 45.

The outer face of the annular piston flange 53 is slidably sealed to the cylindrical inner face of the cylinder member 52 by a sealing ring 59.

Circumferentially spaced pairs of compression springs 60, 60 are mounted between the piston flange 53 and the respective cylinder-head elements 55 and 56 to impel the piston structure back to its middle, neutral, position upon release of fluid pressure holding it in either of its clutch-engaging positions.

Preferably the cylinder-head element 56 is formed integral with the cylinder member 57 and the cylinder-head element 55 is screwed into the cylinder member so that it can be removed for disassembly of the parts.

For charging the right-hand end of the cylinder, to engage the forward-drive clutch 29, a port in that part of the cylinder as shown is in communication, through a passage 61 in the cylinder member and its stud 58, with a passage 62 extending through the stud 45 and its base plate 46, a sealing ring 63 being mounted between the stud 58 and the wall of its socket in the stud 45. The passage 62 leads from an internally threaded socket 62a in the outer face of the plate 46 and adapted to be connected to a suitable source (not shown) of pressure fluid.

For charging the left-hand end of the cylinder, to engage the reverse-drive clutch 30, a port in that part of the cylinder, shown in the lower part of the drawing, is in communication with an internally threaded boss 64 adapted to be connected with a suitable source of pressure fluid by means (not shown) extending through the wall of the housing.

The housing 10 preferably is of one-piece, full-circle, annular, form, and annular closure members 65 and 66 are bolted to its respective ends. The member 65 has a roller bearing 67 and an oil-sealing ring 68 mounted between it and the gear-mounting ring 18. The end-closure member 66 has an oil-sealing ring 69 mounted between it and the driven shaft 13, and it serves as a clamping member for the outer race of the large radial-and-thrust bearing 16.

That bearing race is formed with an oil hole 70 communicating, through a circumferential groove on its outer face, with a threaded socket 71 in the wall of the housing for supplying oil to the parts within the housing, and the housing is provided, at a low position, with an oil-drain passage 72.

The construction as described is such that the assembling operation can be as follows:

First bearing 34 and the numerous clutch, piston, cylinder and gear members, other than the radial-axis gears 42 and their mountings, are mounted on the driven shaft 13 in the open, by being slid onto it in proper order from the left, after which the gear-mounting ring 18 is bolted to the gear 41 and the gear-mounting 36 is bolted to the gear ring 40 while the sub-assembly is still unobstructed.

The sub-assembly thus prepared can be inclusive of the bearing 34, the flanged bushing 37 and its flanged ring 38, and the flanged bushing 37a and its flanged ring 38a.

This sub-assembly is then moved into the housing member 10, from the left, the flanged ring 38 is secured to the inner face of the housing by the bolts 39, and the end-closure member 65, with its bearing 67 and oil-sealing ring 68, is placed on the hub of the gear-mounting ring 18 and it and the flanged ring 38a are secured to the housing member 10 by the bolts 39a.

Then the large radial-and-thrust bearing 16 is mounted upon the shaft 13 and within the housing member 10, from the right, and the end-closure member 66 is put in place and bolted to the casing member 10, thus securing the outer race of that bearing in its shouldered seat in the housing member 10, after which the head 14 is mounted upon the shaft.

Then the coupling member 19, with the spring 20 and its thrust-bearing 21 interposed between it and the shaft 13, and with the rubber-bushing assemblies 25, 26, 27 mounted upon it, is assembled with and bolted to the gear-mounting member 18.

The housing 10, with the parts thus assembled with it, is then mounted, by means of its bolting flange 11, upon the crank-case of the motor, the coupling member 19 being given such rotative position that the studs 25 seat in their sockets in the fly-wheel 12, in which they are then secured by means of the bolts 27, manipulated through the hand holes in the housing which are later closed by the cover-plates 28.

The proportions of the parts are such that as the coupling member 19 is mounted upon the hub of the gear-mounting ring 18, the thrust spring 20 is so preloaded as to sustain at least a substantial part of the propeller thrust and to that degree to relieve the bearing 16 of forward-drive thrust load.

Sufficient end-play can be present in the bearing 16 to provide substantial cushioning of the thrust.

The proportions are such that when the large bearing 16 and the end-closure member 66 are mounted as described the cylinder structure and adjacent parts can be given symmetrical positions for reception of the radial-axis gears 42, pre-assembled with their respective mountings inclusive of the respective closure-plates 46. Those assemblies are then put in place, with the gears 42 meshing with the gears 40 and 41, and the studded plates 46 are bolted in place.

In the operation of the assembly, the fly-wheel 12 being driven, always in the same direction, charging the right-hand end of the cylinder 57 engages the clutch 29 and imparts forward drive to the shaft 13 by directly connecting it with the constantly driven gear 41, the clutch 30 being disengaged by venting of the left-hand end of the cylinder, and the gear 40 idling.

Charging the left-hand end of the cylinder, with venting of its right-hand end, engages the clutch 30 and thus causes the shaft to be driven in reverse direction, through the reversing idlers 42.

When both ends of the cylinder are vented, the springs 60 move the piston to neutral position, disengaging both of the clutches and thus disconnecting the shaft 13 from the fly-wheel.

Modifications are possible without sacrifice of all of the advantages set out in the above statement of objects and without departure from the scope of the invention as defined in the appended claims.

I claim:

1. A gearing assembly comprising a radial-axis gear, a gear-case member having an opening at the position of said gear, an axle stud for said gear having a base constituting a closure member for said opening, and an annular-chamber cylinder-and-piston structure radially inward from said gear and having on its outer periphery means for interlocking it with said axle stud, by radial movement of said stud, against relative axial movement.

2. A gearing assembly comprising a pair of coaxial gear structures, a pair of clutches between said gear structures and adapted to be engaged to activate the gear structures respectively, and means between the gear structures for selectively engaging the clutches, said means comprising an annular-chamber cylinder structure of U-shape in cross-section, open at its radially inner side, an annular piston structure which is of T-shape in cross-section, the stem of the T being slidably sealed to the inner face of the base of the U and each arm of the head of the T being slidably sealed to a leg of the U, and thrust-bearing means radially within the circle of the inner periphery of the cylinder member for transmitting the piston's force axially to the clutches.

3. A gearing assembly comprising a pair of coaxial bevel gears facing each other, a set of bevel-gear idlers each meshed with the two said gears, a mounting including inwardly projecting radial axles for the idlers, forward and reverse clutches between said coaxial gears and adapted to be engaged alternatively to activate the said coaxial gears selectively, cylinder-and-piston means between the coaxial gears for engaging the clutches alternatively, and anchorage means on the cylinder-and-piston means and having interlock relation to the axles of the idlers for sustaining the operating thrust of the cylinder-and-piston means.

THOMAS L. FAWICK.

REFERENCES CITED

The following references are of record in the file of this patent:

UNITED STATES PATENTS

| Number | Name | Date |
| --- | --- | --- |
| 856,763 | Brooks | June 11, 1907 |
| 857,393 | Hagman | June 11, 1907 |
| 1,298,401 | Ricardo | Mar. 25, 1919 |
| 1,470,572 | Holmes | Oct. 9, 1923 |
| 1,569,008 | Dodge | Jan. 12, 1926 |
| 1,866,127 | Persons | July 5, 1932 |
| 1,946,439 | Heller | Feb. 6, 1934 |
| 2,018,794 | Kremser | Oct. 29, 1935 |
| 2,055,970 | Fippard | Sept. 29, 1936 |
| 2,083,059 | Fageol | June 8, 1937 |
| 2,158,054 | Bradbury | May 16, 1939 |
| 2,372,625 | Denton | Mar. 27, 1945 |
| 2,377,468 | Venditty | June 5, 1945 |
| 2,385,369 | Niekamp | Sept. 25, 1945 |
| 2,406,417 | Viviano | Aug. 27, 1946 |

FOREIGN PATENTS

| Number | Country | Date |
| --- | --- | --- |
| 41,842 | The Netherlands | Oct. 15, 1937 |
| 48,980 | Denmark | Jan. 17, 1933 |